United States Patent
Fukutome et al.

(10) Patent No.: US 8,619,339 B2
(45) Date of Patent: Dec. 31, 2013

(54) IMAGE READING APPARATUS AND IMAGE FORMING APPARATUS

(75) Inventors: Shohichi Fukutome, Osaka (JP);
Hironori Ogasawara, Osaka (JP);
Mitsuharu Yoshimoto, Osaka (JP);
Kenji Nakanishi, Osaka (JP); Masahiro Imoto, Osaka (JP); Yasuhiro Suto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 146 days.

(21) Appl. No.: 13/009,011

(22) Filed: Jan. 19, 2011

(65) Prior Publication Data
US 2011/0188092 A1    Aug. 4, 2011

(30) Foreign Application Priority Data
Jan. 29, 2010  (JP) .................................. 2010-017990

(51) Int. Cl.
*H04N 1/40*    (2006.01)

(52) U.S. Cl.
USPC .............................. 358/461; 358/2.1; 358/497

(58) Field of Classification Search
USPC .......................................... 358/461, 2.1, 497
See application file for complete search history.

(56) References Cited

U.S. PATENT DOCUMENTS

| | | | | |
|---|---|---|---|---|
| 7,212,320 | B2* | 5/2007 | Imoto | 358/497 |
| 7,616,351 | B2* | 11/2009 | Higashitani | 358/461 |
| 7,630,102 | B2* | 12/2009 | Kurokawa | 358/474 |
| 2005/0083543 | A1 | 4/2005 | Suzuki et al. | |
| 2005/0280867 | A1* | 12/2005 | Arai | 358/2.1 |

FOREIGN PATENT DOCUMENTS

| | | |
|---|---|---|
| JP | 11-027475 A | 1/1999 |
| JP | 2001-186312 A | 7/2001 |
| JP | 2004-173002 A | 6/2004 |
| JP | 2005-124075 A | 5/2005 |
| JP | 2005-277752 A | 10/2005 |
| JP | 2006-253964 A | 9/2006 |
| JP | 2007-158502 A | 6/2007 |
| JP | 2010-187080 A | 8/2010 |

\* cited by examiner

*Primary Examiner* — Twyler Haskins
*Assistant Examiner* — Michael Burleson
(74) *Attorney, Agent, or Firm* — Renner, Otto, Boisselle & Sklar, LLP (57) ABSTRACT

An image reading apparatus includes a reading glass, a second guide member, and a control section. The reading glass and the second guide member together form a document feed path. The second guide member includes a white reference plate. The control section performs, when it is determined that shading correction image data is affected by a stain, a stain location determination of whether the stain is attached to the reading glass or the second guide member according to a tone value variation in the portion of the shading correction image data that corresponds to the stain edge, the variation being along a predetermined distance in the main scanning direction.

8 Claims, 11 Drawing Sheets

IMAGE READING APPARATUS AND IMAGE FORMING APPARATUS

CROSS REFERENCE

This Nonprovisional application claims priority under 35 U.S.C. §119(a) on Patent Application No. 2010-017990 filed in Japan on Jan. 29, 2010, the entire contents of which are hereby incorporated by reference.

BACKGROUND OF THE INVENTION

This invention relates to an image reading apparatus and an image forming apparatus including a first guide member and a second guide member opposed to each other to form a document feed path.

Some image reading apparatuses include a first guide member and a second guide member opposed to each other to form a document feed path, the first guide member being made of a transparent material, the second guide member including a shading correction white reference member, and an image read section for illuminating light through the first guide member to the second guide member and generating image data from reflected light. The image read section includes a mirror and a lens.

In such an image reading apparatus, a stain such as document ink attached to the first guide member or the second guide member will cause an image from image data to include a black image such as a black point or a black streak. The black image will reduce the image quality.

A well-known image reading apparatus is intended to analyze the image data according to a predetermined algorithm to identify a stained component (see, for example, Japanese Patent Laid-Open Publication No. 2001-186312). Depending on whether the image reading apparatus adopts the static document reading scheme or the fed document reading scheme and on whether the stain has a continuous pattern or an intermittent pattern, the image reading apparatus identifies the stained component such as the mirror, the paper feed roller, or the document glass.

The conventional image reading apparatus described in Japanese Patent Laid-Open Publication No. 2001-186312 attempts to identify the stained component according to the relationship between the document movement and the stain continuity. Although the image reading apparatus may thus identify the stained location in the document feed direction, it cannot identify the stained location in the direction perpendicular to the document image surface.

Thus, the conventional image reading apparatus described in Japanese Patent Laid-Open Publication No. 2001-186312 cannot determine whether the first guide member or the second guide member is stained. If the first guide member is stained, the image read from the document will show a black image. The black image will reduce the image quality of the image data of the document image. It is thus necessary to clean the first guide member. In contrast, if the second guide member is stained, no need to clean the second guide member to prevent the image quality reduction in which the image from the image data of the document image shows a black image.

Therefore, it is necessary to determine whether the first guide member or the second guide member is stained to determine whether the cleaning is needed to prevent the image quality reduction in the image data of the document image. Otherwise, it is likely to experience useless operations including the maintainer's unnecessary cleaning of the image reading apparatus and useless adjustment or replacement of the shading correction image data.

It is an object of the present invention to provide an image reading apparatus and an image forming apparatus capable of preventing a useless operation.

SUMMARY OF THE INVENTION

An image reading apparatus according to the invention includes a first guide member, a second guide member, an image read section, and a control section. The first guide member and the second guide member are opposed to each other to form a document feed path. The first guide member is made of a transparent material. The second guide member includes a shading correction white reference member. The image read section illuminates light through the first guide member to the second guide member, and generates image data from reflected light. The control section performs a stain presence determination of whether the shading correction image data generated by the image read section reading the image of the white reference member is affected by a stain attached to the first guide member or the second guide member, a stain location determination of whether, when it is determined that the image data is affected by the stain, the stain is attached to the first guide member or the second guide member according to a tone value variation in the m portion of the shading correction image data that corresponds to the stain edge, the variation being along a predetermined distance in the main scanning direction, and a handling process for handling the stain on the first guide member and the second guide member according to the stain location determination.

In this configuration, the shading correction image data is generated when no document is fed through the document feed path. Light is illuminated through the first guide member to the second guide member. If the second guide member is stained, a small space exists between the stain and the white reference member. The small space causes a small amount of light to be illuminated to the portion of the white reference member opposed to the edge of the stain. If the first guide member is stained, a larger space exists between the stain and the white reference member than if the second guide member is stained. The larger space causes a more amount of light to be illuminated to the portion of the white reference member opposed to the edge of the stain. Thus, if the first guide member is stained, compared to if the second guide member is stained, lighter blur exists at the edge of the black image in the image from the shading correction image data. In the image from the shading correction image data, most of the pixels are white except in the black image due to the stain. Thus, if the first guide member is stained, compared to if the second guide member is stained, less tone value variation exists in the portion of the shading correction image data that corresponds to the stain edge, the variation being along a predetermined distance in the main scanning direction. Therefore, the tone value variation in the portion of the shading correction image data that corresponds to the stain edge, the variation being along a predetermined distance in the main scanning direction, may be used for a stain location determination of where the first guide member or the second guide member is stained. The handling process is thus performed accurately. The present invention may thus prevent a useless operation.

BRIEF DESCRIPTION OF THE DRAWINGS

FIG. 5A and FIG. 5B are enlarged side views of a part of a second image read section. FIG. 5A shows a stain attached to an opposed glass. FIG. 5B shows a stain attached to a reading glass;

FIG. 9A and FIG. 9B are enlarged side views of a part of the second image read section in an image reading apparatus according to another embodiment. FIG. 9A shows a stain attached to a second guide member. FIG. 9B shows a stain attached to a reading glass;

DETAILED DESCRIPTION OF THE INVENTION

The exemplary embodiments of the invention will be described below with reference to the accompanying drawings.

Figure 1:
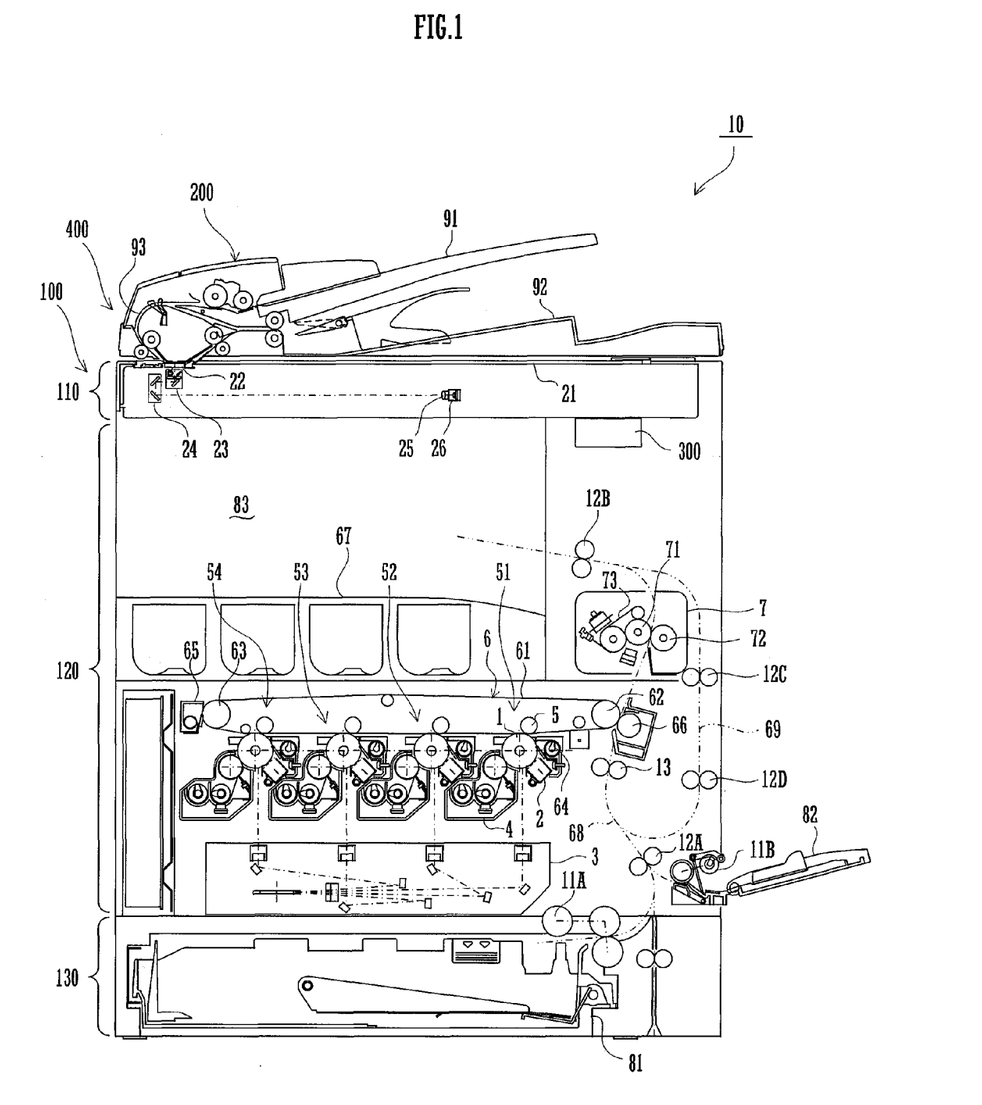
FIG. 1 is a front view of a schematic configuration of an image forming apparatus according to an embodiment of the invention.

With reference to FIG. 1, an image forming apparatus 10 includes an apparatus main body 100, an automatic document feeder (ADF) 200, and a control section 300.

The apparatus main body 100 includes a first image read section 110, an image forming section 120, and a paper feed section 130. The first image read section 110 is disposed on the top portion of the apparatus main body 100. The image forming section 120 is disposed under the first image read section 110. The paper feed section 130 is disposed under the image forming section 120. The first image read section 110 and the ADF 200 together form an image reading apparatus 400.

The image forming section 120 includes a space 83 under the first image read section 110. The space 83 is to provide a paper output tray 67 containing image-formed sheets. The image forming section 120 thus has a portion whose horizontal cross sectional area is smaller than that of the first image read section 110. The apparatus main body 100 then has a so-called intra-body output structure. The sheet includes plain paper, photographic paper, and a recording medium such as an OHP film.

The image forming section 120 includes an exposure unit 3, four image forming sections 51, 52, 53, and 54, an intermediate transfer belt unit 6, a secondary transfer roller 66, a fixing device 7, the paper output tray 67, and paper feed paths 68 and 69. The image forming section 120 is adapted to form an image on a sheet.

The intermediate transfer belt unit 6 includes an intermediate transfer belt 61, a driving roller 62, a driven roller 63, and a tension roller. The intermediate transfer belt 61 is entrained about the driving roller 62 and the driven roller 63, thus forming a loop travel path.

The image forming section 120 forms an image in the image forming sections 51, 52, 53, and 54 using a set of image data corresponding to the respective hues of four colors, black, cyan, magenta, and yellow. The cyan, magenta, and yellow are the three subtractive primary colors acquired by color separation of a color image. The image forming sections 51 to 54 are aligned along the travel path of the intermediate transfer belt 61. The image forming sections 52 to 54 are configured in substantially the same way as the image forming section 51.

The black image forming section 51 includes a photoreceptor drum 1, an electrostatic charger device 2, a developing device 4, a primary transfer roller 5, and a cleaning unit 64.

The electrostatic charger device 2 electrically and uniformly charges the surface of the photoreceptor drum 1 to a predetermined potential.

The exposure unit 3 includes (not shown) a semiconductor laser, a polygon mirror, a first fθ lens, and a second fθ lens. The exposure unit 3 illuminates the laser beams modulated by the image data of the hues of black, cyan, magenta, and yellow to the photoreceptor drums 1 of the image forming sections 51 to 54, respectively. On the circumferential surfaces of the four photoreceptor drums 1, electrostatic latent images are formed according to the respective hues of black, cyan, magenta, and yellow.

After the electrostatic latent images are formed on the circumferential surfaces of the photoreceptor drums 1, the developing devices 4 supply the surfaces with toners (developers) of the respective hues of the image forming sections 51 to 54. The electrostatic latent images are thus visualized to the developer images.

The cleaning unit 64 recovers the residual toner on the surface of the photoreceptor drum 1 after the development and the image transfer.

Any given point on the outer surface of the intermediate transfer belt 61 faces the four photoreceptor drums 1 in sequence. The primary transfer rollers 5 are opposed to the respective photoreceptor drums 1 across the intermediate transfer belt 61. Primary transfer positions are the positions at which the intermediate transfer belt 61 faces the photoreceptor drums 1.

The primary transfer rollers 5 are each applied with a primary transfer bias by a constant voltage control. The primary transfer bias has a polarity (plus) opposite to the polarity (minus) of the electrostatically charged toner. The transfer rollers 5 may thus transfer the developer image born on the circumferential surfaces of the photoreceptor drums 1 to the intermediate transfer belt 61. The developer images of the respective hues formed on the respective photoreceptor drums 1 are thus transferred to the outer surface of the intermediate transfer belt 61 sequentially. A full-color developer image is thus formed on the outer surface of the intermediate transfer belt 61.

Note that when input image data includes only some of the hues of yellow, magenta, cyan, and black, the electrostatic latent images and the developer images are formed only on those of the four photoreceptor drums 1 that correspond to the hues of the input image data. In the monochrome printing mode, for example, the electrostatic latent image and the developer image are formed only on the photoreceptor drum 1 of the image forming section 51 that corresponds to the hue of black, and only the black developer image is transferred (primary transfer) to the outer surface of the intermediate transfer belt 61.

In the full-color image formation in which all of the image forming sections 51 to 54 form images, the four primary transfer rollers 5 press the intermediate transfer belt 61 against all of the photoreceptor drums 1. On the other hand, in the monochrome image formation in which only the forming section 51 forms an image, only the primary transfer roller 5 of the image forming section 51 presses the intermediate transfer belt 61 against the photoreceptor drum 1.

Each primary transfer roller 5 includes a shaft of metal (such as stainless steel) whose surface is covered with electrically conductive elastic material. The electrically conductive elastic material allows uniform application of a high voltage to the intermediate transfer belt 61.

The secondary transfer roller 66 is pressed against the driving roller 62 at a predetermined nip pressure via the intermediate transfer belt 61. The secondary transfer roller 66 is made of a hard and electrically conductive resin. The secondary transfer roller 66 transfers (secondary transfer) the developer image born on the outer surface of the intermediate transfer belt 61 to the sheet.

The developer image transferred to the outer surface of the intermediate transfer belt 61 at each primary transfer position is fed by a rotation of the intermediate transfer belt 61 to a secondary transfer position at which the intermediate transfer belt 61 and the secondary transfer roller 66 face each other.

The paper feed section 130 includes a paper feed cassette 81 that contains sheets. The paper feed path 68 includes a plurality of feed rollers 12A and 12B disposed therein. The paper feed path 68 is disposed in a generally vertical direction to send the sheets contained in the paper feed cassette 81 to the paper output tray 67 via the secondary transfer position and the fixing device 7.

The paper feed path 69 includes a plurality of feed rollers 12C and 12D disposed therein. The paper feed path 69 extends, in the paper feed direction, from downstream of the fixing device 7 to upstream of the secondary transfer position. A sheet to be output to the paper output tray 67 after passing through the fixing device 7 is fed through the paper feed path 69 with its back end being brought forward. The sheet is thus turned upside down and refed to the secondary transfer position.

The paper feed section 130 includes a manual feed tray 82 in addition to the paper feed cassette 81. The paper feed cassette 81 and the manual feed tray 82 each contain sheets.

The paper feed section 130 feeds sheets one by one from either the paper feed cassette 81 or the manual feed tray 82.

The sheets contained in the paper feed cassette 81 are fed by a pickup roller 11A and then fed to the secondary transfer position via the paper feed path 68. The sheets contained in the manual feed tray 82 are fed by a pickup roller 11B and then fed to the secondary transfer position via the paper feed path 68.

A registration roller 13 is disposed in the paper feed direction upstream of the secondary transfer position. The registration roller 13 starts rotating at a timing to align the tip of the sheet fed from the paper feed cassette 81 or the manual feed tray 82 with the tip of the developer image formed on the surface of the intermediate transfer belt 61. The rotation then feeds the sheet to the secondary transfer position.

Before the sheet fed from the paper feed section 130 passes through the secondary transfer position, the driving roller 62 is applied with a high transfer voltage having the same polarity (minus) as the polarity (minus) of the electrically charged toner. The developer image is thus secondarily transferred from the outer surface of the intermediate transfer belt 61 to the sheet surface.

After the developer image is transferred to the sheet, the residual developer on the intermediate transfer belt 61 is recovered by an intermediate transfer belt cleaning device 65.

The sheet having the developer image transferred thereto is guided to the fixing device 7. The sheet then passes between a heating roller 71 and a pressure roller 72, which the rollers heat and pressurize the sheet. The developer image is thus firmly fixed to the sheet surface. The sheet having the developer image fixed thereto is output onto the paper output tray 67 with the developer-image-fixed-surface down.

Figure 2:
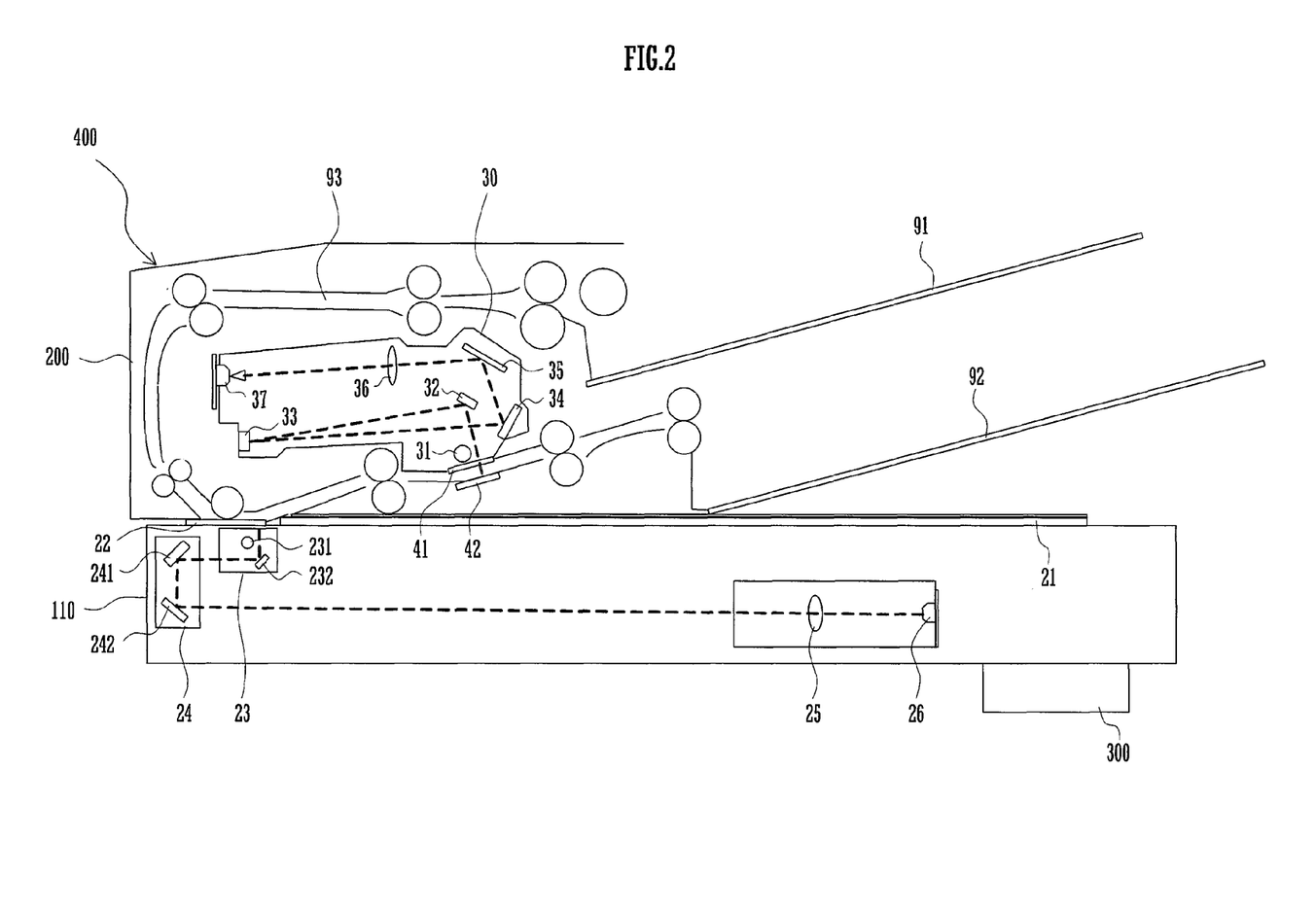
FIG. 2 is an enlarged view of the image reading apparatus.

With reference to FIG. 2, the image reading apparatus 400 includes the ADF 200 and the first image read section 110. The first image read section 110 includes a first platen 21, a second platen 22, a light source unit 23, a mirror unit 24, a lens 25, and a charge coupled device (CCD) 26. The first image read section 110 performs an image reading process that reads the image on a first surface of the document to generate image data.

The ADF 200 includes a document load tray 91, a document output tray 92, a document feed path 93, and a second image read section 30. The document feed path 93 is formed to extend from the document load tray 91 via the second platen 22 to the document output tray 92. Along the document feed path 93, more than one pair of feed rollers for feeding documents are disposed.

The ADF 200 feeds documents one by one to the document feed path 93. The ADF 200 can freely turn around the rear side end opposite to the front side to cover the top surface of the first platen 21 in an openable and closable manner. By turning the ADF 200 to move the front side end upward to expose the top surface of the first platen 21, a document may be mounted on the first platen 21 manually without using the ADF 200.

The first platen 21 and the second platen 22 are both made of a hard glass plate.

The light source unit 23 and the mirror unit 24 are provided under the first platen 21 and the second platen 22. The units 23 and 24 are movable in the sub scanning direction along the first platen 21 and the second platen 22. The mirror unit 24 has half the movement speed of the light source unit 23. The light source unit 23 includes a light source 231 and a first mirror 232. The light source 231 emits diffusion light. The mirror unit 24 includes a second mirror 241 and a third mirror 242.

When reading the image of a document fed by the ADF 200, the light source unit 23 is stopped under the second platen 22. The second platen 22 forms a part of the document feed path 93. A not-shown document guide plate is opposed to the second platen 22 across the space in which a document is fed. The document guide plate forms a part of the document feed path. The guide plate includes a shading correction white reference plate (a white reference member).

The light source 231 emits light through the second platen 22 to the white reference plate. When a document is fed through the document feed path 93, the light source 231 emits light over the first surface of the document passing on the second platen 22. Reflected light from the first surface of the document is reflected by the first mirror 232 toward the mirror unit 24.

When reading the image of the document mounted on the first platen 21, the light source unit 23 and the mirror unit 24 move under the first platen 21 in the sub scanning direction. The light source 231 emits light to the first surface of the document mounted on the first platen 21. Reflected light from the first surface of the document is reflected by the first mirror 232 toward the mirror unit 24.

Whether the ADF 200 is used or not, reflected light from the first surface of the document is directed by the second mirror 241 and the third mirror 242 through the lens 25 to the CCD 26 with the optical path length kept constant.

The CCD 26 outputs an electrical signal in proportion to the amount of reflected light from the first surface of the document. The electrical signal is input to the control section 300 as image data. In this way, the first image read section 110 reads the image of the first surface of the document to generate image data. The control section 300 outputs image data to the image forming section 120 as necessary.

The second image read section 30 is built in the ADF 200 and is surrounded by the document feed path 93 at the upper face, the lower face, and one side face. The second image read section 30 reads, in the document feed direction and downstream of the second platen 22, the image of the second surface opposite to the first surface of a document to generate image data. Image data generated by the second image read section 30 is input to the control section 300.

The second image read section 30 includes a light source 31, a first mirror 32, a second mirror 33, a third mirror 34, a fourth mirror 35, a lens 36, and a CCD 37. A reading glass 41 is opposed to the light source 31. The reading glass 41 is made of a transparent material. The reading glass 41 provides a first guide member. A second guide member 42 is opposed to the first guide member. The first and second guide members together form a portion of the document feed path 93.

The light source 31 emits diffusion light. Light from the light source 31 passes through the reading glass 41 to the second guide member 42. The document or the second guide member 42 reflects light. Light is then reflected by the first mirror 32, the second mirror 33, the third mirror 34, and the fourth mirror 35, through the lens 36, to the CCD 37. The CCD 37, as with the CCD 26, photoelectrically converts incident light to image data and outputs it to the control section 300.

The apparatus main body 100 has a not-shown operating section on the front side of its top surface. The operating section includes an input section 102 (see FIG. 3) and a display section 103, the input section 102 including a plurality of operation keys. As the display section 103, a liquid crystal touch panel is used, for example. The display section 103 displays according to input display data.

Figure 3:
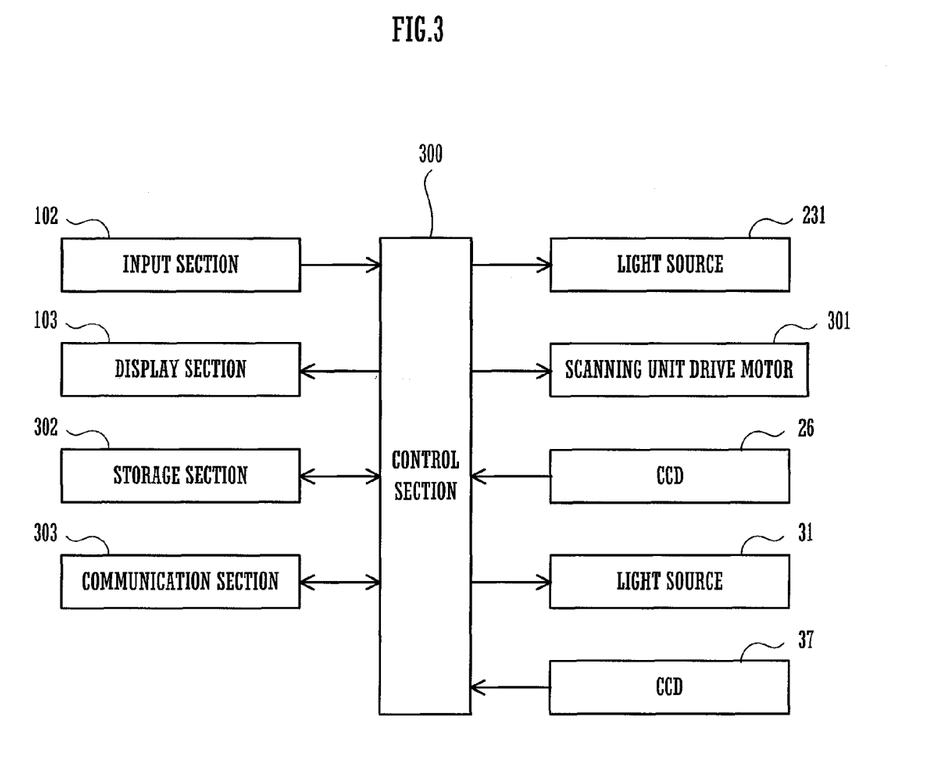
FIG. 3 is a block diagram of a schematic electrical configuration of the image forming apparatus.

With reference to FIG. 3, the control section 300 controls the first image read section 110 as follows. The light source 231 is driven. A scanning unit drive motor 301 is then driven to displace the scanning unit including the light source unit 23 and the mirror unit 24. The electrical signal photoelectrically converted from incident light on the CCD 26 is thus acquired as image data. The image data is stored in a storage section 302. Similarly, the control section 300 controls the second image read section 30 as follows. The light source 31 is driven to acquire the electrical signal photoelectrically converted from incident light on the CCD 37 as image data. The image data is then stored in the storage section 302.

The control section 300 may also receive image data from external devices through a communication section 303. The communication section 303 includes a fax modem connected to a public telephone line and a LAN card connected to a local area network (LAN) line.

Using setting information received by the input section 102, the control section 300 comprehensively controls the image forming apparatus 10.

An example of the process procedure of the control section 300 will now be described. Note that although in this specification, a description will be given of the G shading correction image data among the sets of shading correction image data of light's three primary colors R, G, and B, the same holds true for the R and G shading correction image data. unless otherwise stated.

Figure 4:
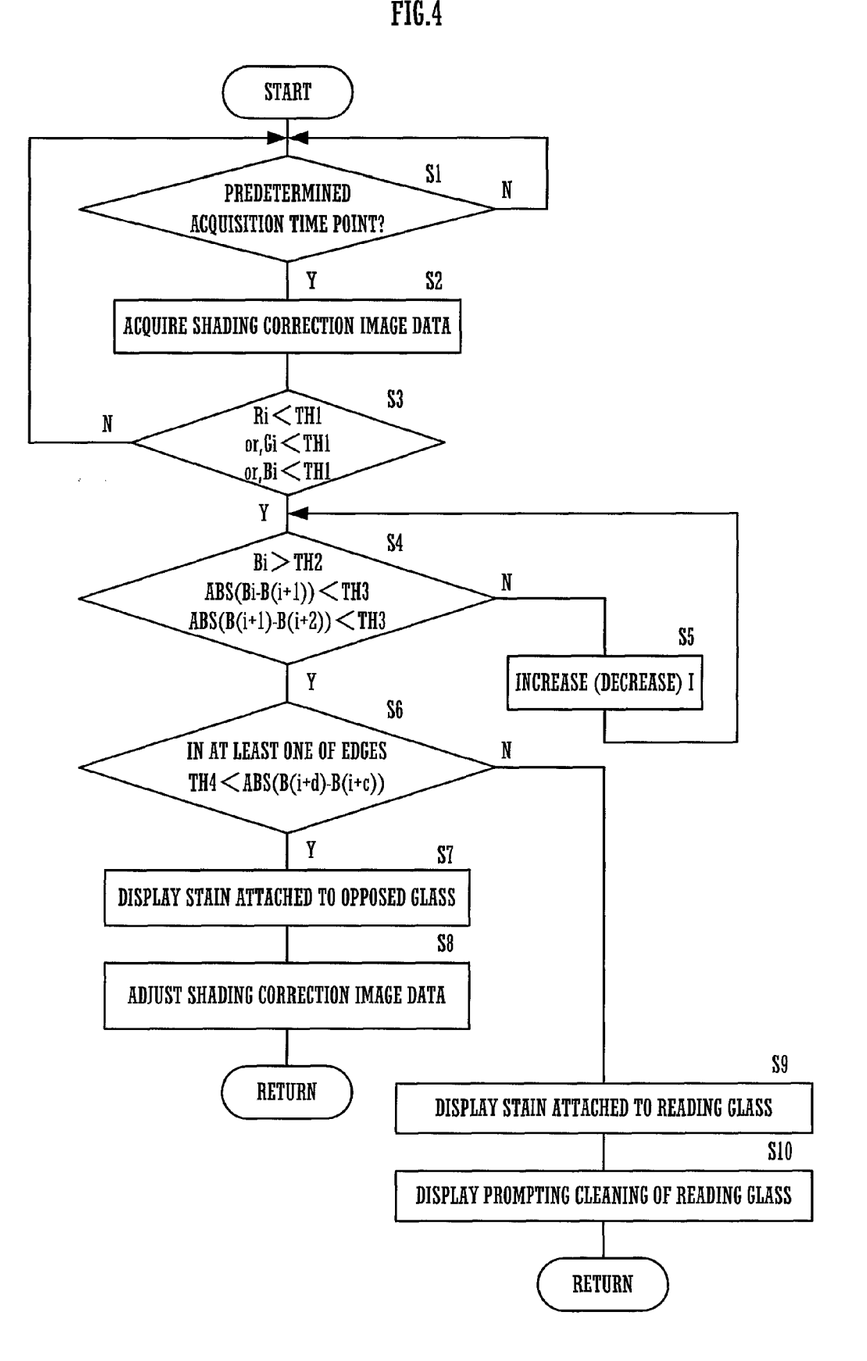
FIG. 4 is a flowchart of an example process procedure of a control section.

With reference to FIG. 4, the control section 300 reads, at a preset predetermined acquisition time point such as startup (S1), without feeding a document, an image of a white reference plate 422 (see FIGS. 5A and 5B) to acquire shading correction image data (S2).

At a predetermined acquisition time point of shading correction image data, the control section 300 acquires shading correction image data in each of the first image read section 110 and the second image read section 30. The control section 300 then performs a predetermined process for each of the image read sections 110 and 30.

Although, in this embodiment, the second image read section 30 will be described, the advantages of the present invention applied to the first image read section 110 may be similar to those of the present invention applied to the second image read section 30.

Figure 5A:
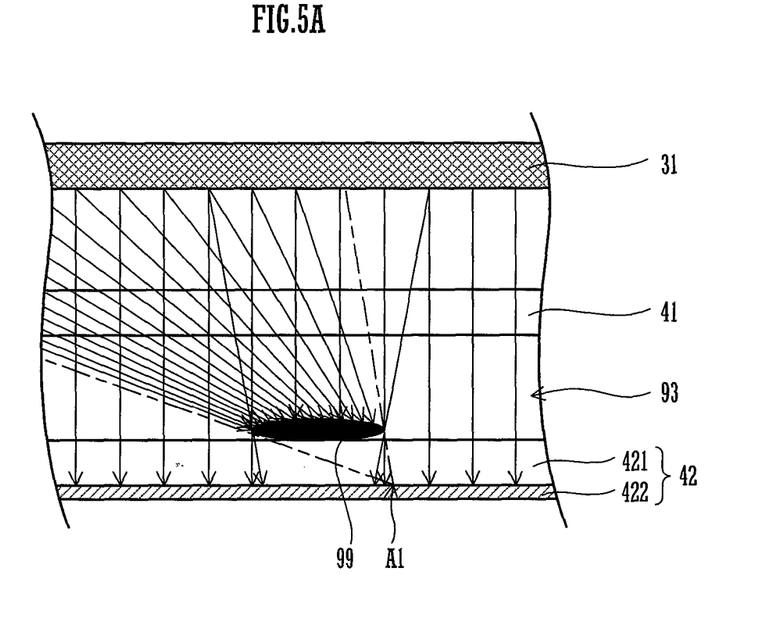
Figure 5B:
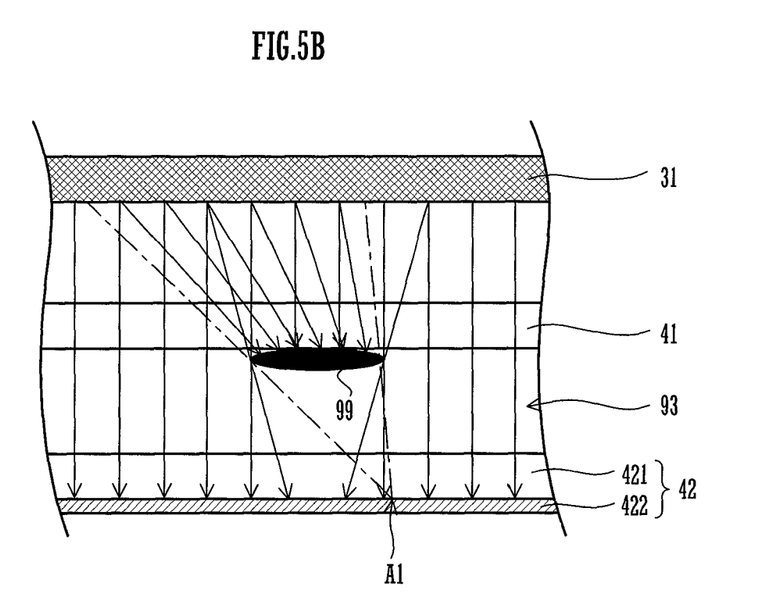

With reference to FIG. 5A and FIG. 5B, the main scanning direction is the horizontal direction in the plane of the figures, and the direction along the document feed direction is the direction perpendicular to the plane of the figures.

The second image read section 30 has a second image reading position at which the reading glass 41 and the second guide member 42 are opposed to each other to form the document feed path 93. The second guide member 42 includes an opposed glass 421 made of a transparent material and the white reference plate 422. The reference plate 422 provides the shading correction white reference member. The white reference plate 422 is opposed to the reading glass 41 across the opposed glass 421. Specifically, the light source 31, the reading glass 41, the opposed glass 421, and the white reference plate 422 are arranged in this order. The document is fed through between the reading glass 41 and the opposed glass 421. The reading glass 41 and the opposed glass 421 provide the inner sides of the document feed path 93. The inner sides may have a stain 99 attached thereto, such as document ink.

The second image read section 30 illuminates light through the reading glass 41 to the second guide member 42 and collects reflected light to generate image data. The stain 99 attached to the reading glass 41 or the opposed glass 421 will thus cause an image from image data input from the CCD 37 to the control section 300 to include a black image such as a black point or a black streak.

Therefore, the control section 300 performs a stain presence determination of whether the shading correction image data is affected by the stain 99 attached to the reading glass 41 or the opposed glass 421 (S3). By way of example, the control section 300 determines whether at least one of the sets of shading correction image data for light's three primary colors R, G, and B has a pixel whose tone value is less than a preset first threshold TH1. Specifically, the control section 300 determines that the shading correction image data is affected by the stain 99 attached to the reading glass 41 or the opposed glass 421 if at least one of the following holds true: the red hue tone value $Ri < TH1$; the green hue tone value $Gi < TH1$; and the blue hue tone value $Bi < TH1$ holds true. The variable i is an integer.

If the shading correction image data is not affected by the stain 99 attached to the reading glass 41 or the opposed glass 421, the control section 300 uses the shading correction image data to perform a well-known shading correction process at a predetermined performing time point, and then waits until the next acquisition time point of the shading correction image data.

If it is determined that the shading correction image data is affected by the stain 99 attached to the reading glass 41 or the opposed glass 421, the control section 300 uses the tone value variation in the portion of the shading correction image data that corresponds to the edge of the stain 99, the variation being along a predetermined distance in the main scanning direction, to perform a stain location determination of whether the stain 99 is attached to the reading glass 41 or the opposed glass (the second guide member) 421.

The stain location determination will be described below.

With reference to FIG. 5A and FIG. 5B, the portion of the white reference plate 422 directly opposite to the light source 31 across the stain 99 (i.e., in FIG. 5A and FIG. 5B, the portion of the white reference plate 422 directly below the stain 99) does not receive light emitted from the portion of the light source 31 nearest to the white reference plate 422 (i.e., in FIG. 5A and FIG. 5B, light from the portion of the light source 31 directly above the stain 99), because the light is blocked by the stain 99. The portion of the light source 31 nearest to the white reference plate 422 emits the strongest light. The portion of the white reference plate 422 that does not receive light emitted from the nearest portion of the light source 31 thus provides a black image in the image from the shading correction image data.

The portion of the white reference plate 422 opposed to the edge of the stain 99, which receives some relatively weak light emitted from the other portions of the light source 31 except the portion nearest to the white reference plate 422, provides a blur at the edge of the black image in the image from the shading correction image data.

With reference to FIG. 5A, the stain 99 attached to the opposed glass 421 provides a small space between the stain 99 and the white reference plate 422. The portion of the white reference plate 422 opposed to the edge of the stain 99 thus receives less light from the light source 31. On the other hand, with reference to FIG. 5B, the stain 99 attached to the reading glass 41 provides a larger space between the stain 99 and the white reference plate 422 than the stain 99 attached to the opposed glass 421. The portion of the white reference plate 422 opposed to the edge of the stain 99 thus receives more light from the light source 31.

For example, at the point A1 of the portion of the white reference plate 422 opposed to the edge of the stain 99, more light is blocked by the stain 99 attached to the opposed glass 421 than the stain 99 attached to the reading glass 41.

Thus, the stain 99 attached to the reading glass 41 provides lighter blur at the edge of the black image in the image from the shading correction image data than the stain 99 attached to the opposed glass 421.

Figure 6A:
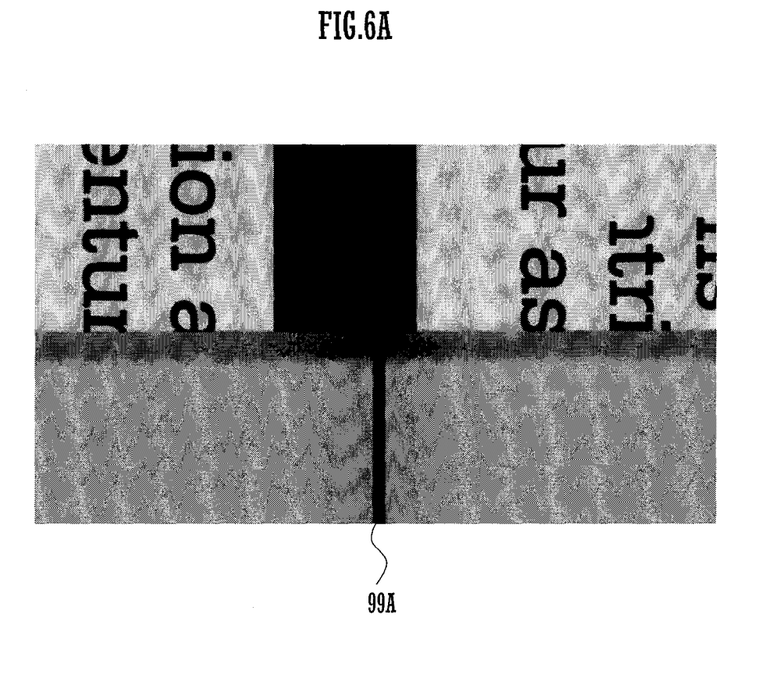
FIG. 6A shows an example black streak in a printed image for a stained opposed glass.
Figure 6B:
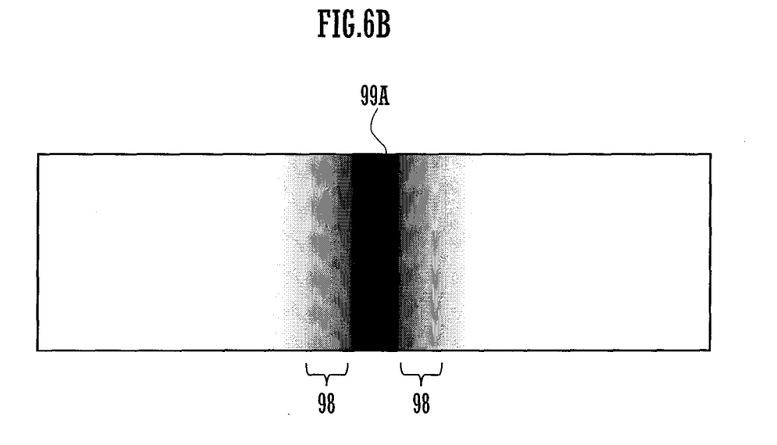
FIG. 6B shows an example black streak in a printed image for a stained reading glass.

With reference to FIG. 6A, the stain 99 attached to the opposed glass 421 provides darker blur at the edge of the black image 99A, and the blur may be too dark to be distinguished from the black image 99A in some cases. With reference to FIG. 6B, the stain 99 attached to the reading glass 41 provides lighter blur 98 at the edge of the black image 99A. Note that FIG. 6A and FIG. 6B only illustrate the blur 98 and FIG. 6A and FIG. 6B show the differently sized stains 99.

Figure 7:
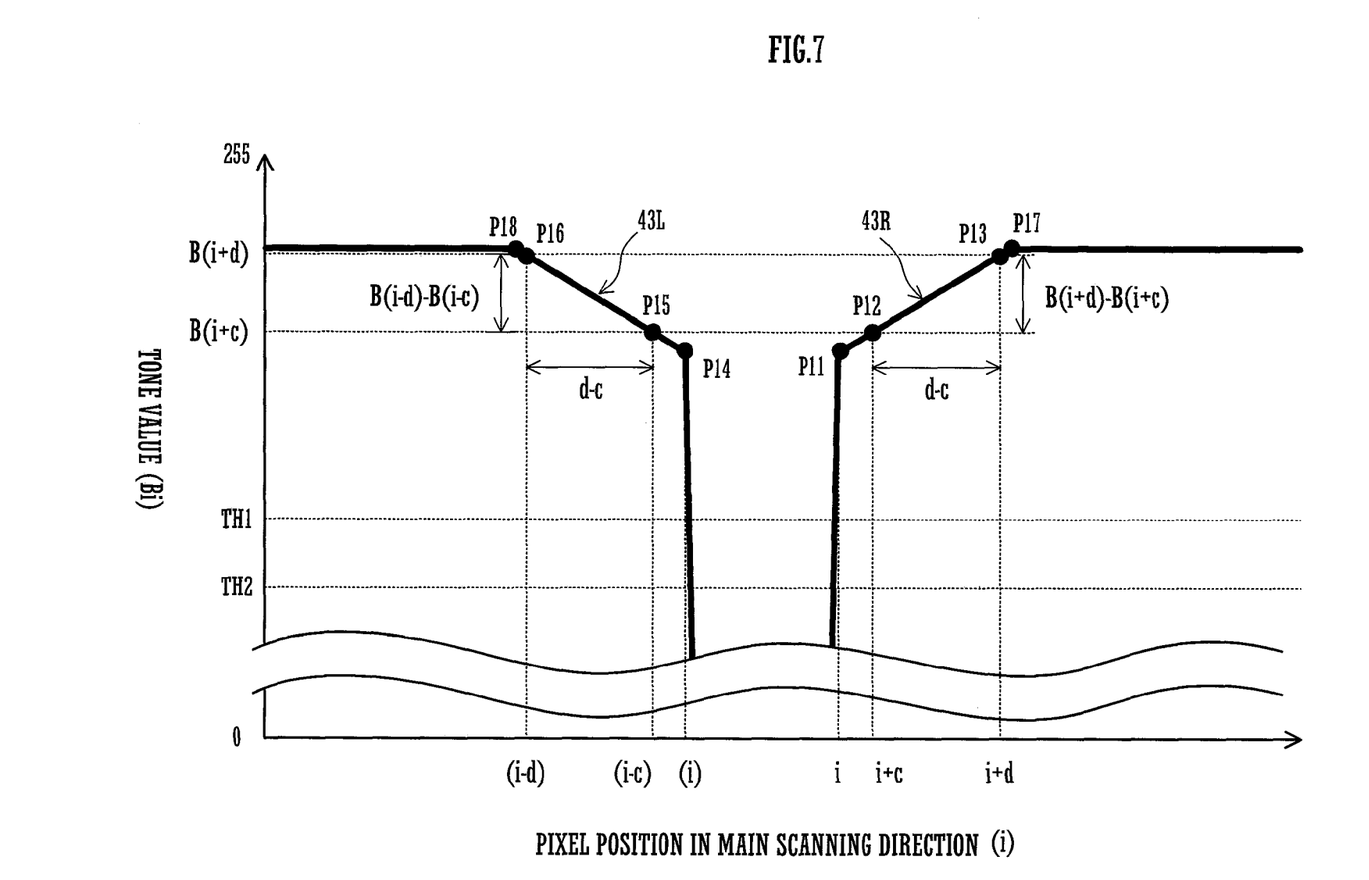
FIG. 7 shows the relationship between a pixel position and a tone value in the main scanning direction in the shading correction image data for a stained opposed glass.
Figure 8:
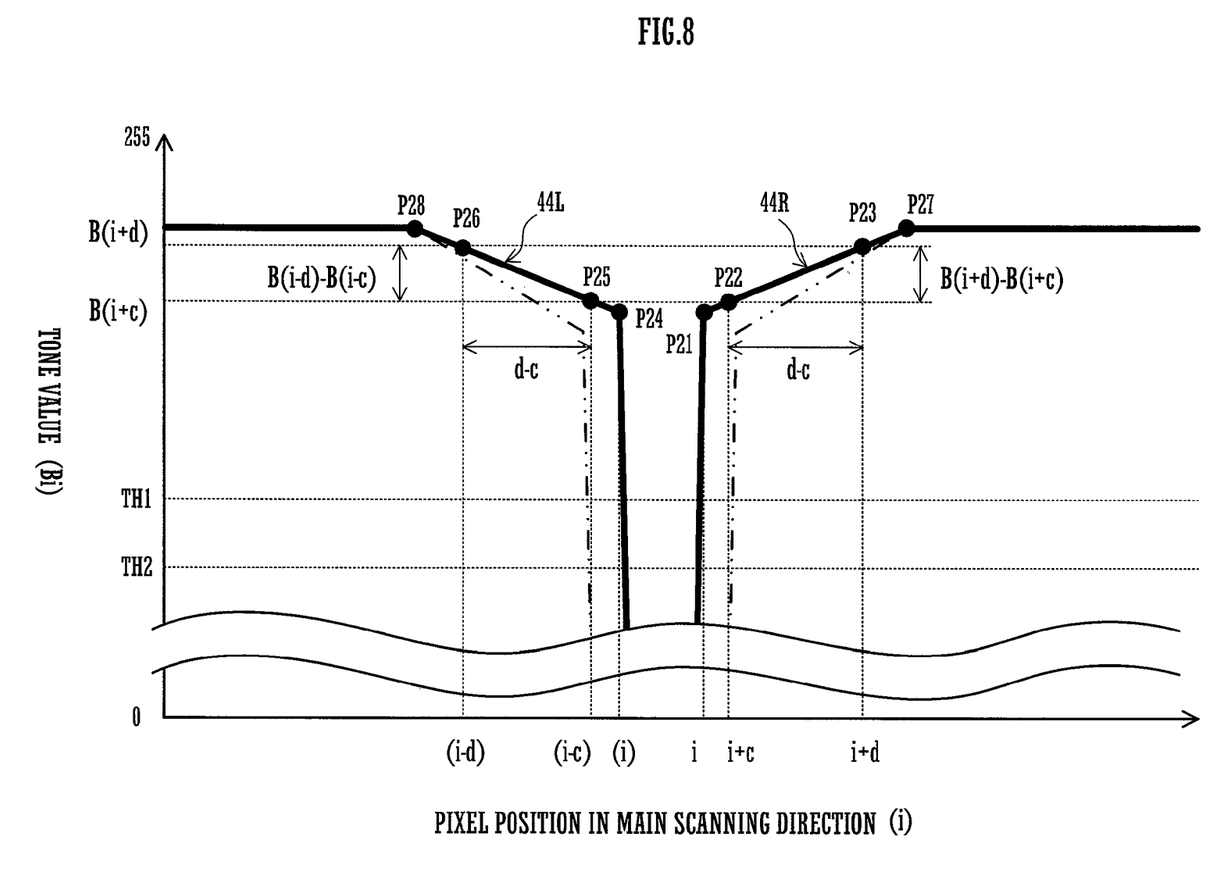
FIG. 8 shows the relationship between a pixel position and a tone value in the main scanning direction in the shading correction image data for a stained reading glass.

FIG. 7 shows the relationship between a tone value and a pixel position in the main scanning direction in the shading correction image data for the stain 99 attached to the opposed glass 421. FIG. 8 shows the relationship between a tone value and a pixel position in the main scanning direction in the shading correction image data for the stain 99 attached to the reading glass 41.

Note that FIG. 7 and FIG. 8 show, by way of example, the y-axis tone value in 256 levels from 0 to 255. Although FIG. 7 and FIG. 8 show, by way of example, the blue B shading correction image data, the same holds true for the red R and the green G shading correction image data. The chain double-dashed lines in FIG. 8 show, for comparison the relationship between a pixel position and a tone value in the shading correction image data shown in FIG. 7 as the heavy lines. The values c and d are pixel numbers (positive integers) set according to the pre-experimental results. The value d is larger than the value c. For example, c=10 and d=50. The first threshold TH1 and the second threshold TH2 are tone values of the shading correction image data that are set according to the pre-experimental results.

When the portion of the white reference plate 422 opposed to the stain 99 receives light from the light source 31, the portions 43R, 43L, 44R, and 44L of the shading correction image data that correspond to the edge of the stain 99 each have a gradient. In FIG. 7 and FIG. 8, 43R and 44R indicate the portions corresponding to the right side edge of the stain 99 in the shading correction image data, and 43L and 44L indicate the portions corresponding to the left side edge.

The gradient means the tone value variation (B(i+d)−B(i+c)) in the portions 43R and 44R of the shading correction image data that correspond to the edge of the stain 99, the variation being along a predetermined distance (d−c) in the main scanning direction. The stain 99 attached to the reading glass 41 provides less gradient than the stain 99 attached to the opposed glass 421. This is because the former provides more light to the portion of the white reference plate 422 opposed to the edge of the stain 99 from the light source 31 than the latter. The same holds true for the portions 43L and 44L corresponding to the edge.

Therefore, the tone value variation in the portion of the shading correction image data that corresponds to the edge of the stain 99, the variation being along a predetermined distance in the main scanning direction, may be used to perform the stain location determination of whether the stain 99 is attached to the reading glass 41 or the opposed glass 421.

The control section 300 recognizes the portion 43R of the shading correction image data that corresponds to the edge of the stain 99 as follows. The same holds true for the portions 43L, 44R, and 44L.

The control section 300 determines, for each pixel, if the tone value Bi is larger than the second threshold TH2 and the tone value differences between the two adjacent pixels are successively less than the third threshold TH3 (S4). Increasing (decreasing for the portion 43L) the variable i in increments of 1 (one) (S5), the control section 300 repeats the determination at S4. The control section 300 then identifies the pixel that meets the condition at S4 as the point P11 (or the point P14 for the portion 43L) that indicates the boundary between the following two portions in the shading correction image data: the portion corresponding to the black image that is an extremely black region compared to the other pixel regions and the portion 43R (43L) corresponding to the edge of the stain 99.

Specifically, the control section 300 repeats the following operations, for example, for each pixel to identify the point P11.

$Bi > TH2$, and $ABS(Bi - B(i+1)) < TH3$, and $ABS(B(i+1) - B(i+2)) < TH3$, where ABS is an operator for computing the absolute value.

With the pixel value of the point P11 defined as i, the control section 300 acquires, for the point P12 having the pixel value (i+c) and the point P13 having the pixel value (i+d), the variation (B(i+d)−B(i+c)) of the tone value along a predetermined distance (d-c) in the main scanning direction.

The reason for the use of the point 12 instead of the point P11 is that the margin of the value c may allow more accurate acquisition of the gradient in the portion 43R corresponding to the edge of the stain 99.

The control section 300 determines that a stain is attached to the opposed glass 421 if, in at least one of the portion 43R corresponding to the right side edge of the stain 99 and the portion 43L corresponding to the left side edge of the stain 99, the absolute value of the variation (B(i+d)−B(i+c)) is larger than a preset fourth threshold TH4 (S6). The fourth threshold TH4 is set according to pre-experimental results.

The control section 300 performs a handling process for handling the stain 99 of the reading glass 41 or the second guide member 42 based on the stain location determination. For example, the control section 300 uses the stain location determination to provide the display section 103 with display data displaying information on whether the stain 99 is attached to the reading glass 41 or the second guide member 42 (S7 and S9).

Display of information on whether the stain 99 is attached to the reading glass 41 or the second guide member 42 may allow the maintainer of the image reading apparatus 400 to accurately handle the stain 99. Specifically, as accurate handlings, the maintainer may clean the reading glass 41 for the stain 99 attached to the reading glass 41 and may not clean the second guide member 42 for the stain 99 attached to the second guide member 42. The reason for the latter is that the image from the image data read from the document will not show the stain 99 attached to the second guide member 42.

If the stain location determination shows that the stain 99 is attached to the opposed glass 421, the control section 300 adjusts the shading correction image data to be less affected by the stain 99 attached to the opposed glass 421 (S8).

Specifically, by way of example, the control section 300 sets boundary points P17 and P18 for the portions 43R and 43L, respectively. The point P17 (P18) is the boundary between the portion 43R (43L) and the portion of the shading correction image data that does not include the stain 99. The control section 300 sets, as the points P17 and P18, the points whose tone value variations between five continuous pixels are less than a fifth threshold (for example, 2 (two)). The control section 300 then adjusts the shading correction image data to joint the points P17 and P18 with a straight line. The control section 300 may also adjust the shading correction image data to join the point P13 and the point P16 with a straight line. The shading correction image data is thus less affected by the stain 99 attached to the opposed glass 421.

Note that the control section 300 stores, in the storage section 302, the shading correction image data acquired by reading the image of the white reference plate 422 during manufacture. The control section 300 may be adapted to replace, if the stain location determination shows that the stain is attached to the opposed glass 421, the shading correction image data generated by the second image read section 30 at a predetermined acquisition time point with the shading correction image data pre-stored in the storage section 302.

If the control section 300 determines, at S6, that both of the portions 43R and 43L corresponding to the edge of the stain 99 have an absolute value of the variation (B(i+d)−B(i+c)) less than the fourth threshold TH4, that is, the stain 99 is unattached to the opposed glass 421, then the control section 300 determines that the stain 99 is attached to the reading glass 41. The control section 300 then provides the display section 103 with display data displaying that the stain 99 is attached to the reading glass 41 (S9).

If the stain location determination at S6 shows that the stain 99 is attached to the reading glass 41, the control section 300 further provides the display section 103 with display data prompting cleaning of the reading glass 41 (S10).

For the stain 99 attached to the reading glass 41, the display prompting cleaning of the reading glass 41 allows the maintainer to accurately handle the stain 99 to improve the image quality of the image data read from the document image.

If the stain location determination shows that the stain 99 is attached to the opposed glass 421, the control section 300 does not provide the display section 103 with display data prompting cleaning of the opposed glass 421.

If the stain 99 is attached to the second guide member 42, the image from the image data read from the document will not show the stain 99 attached to the second guide member 42. The maintainer may thus omit the useless operation of the unnecessary cleaning of the second guide member 42.

Figure 9A:
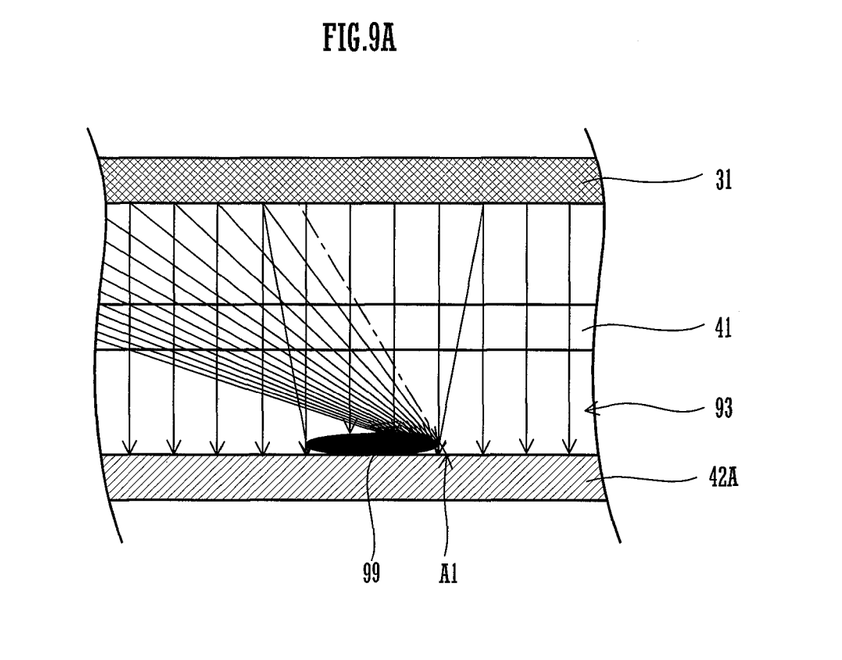
Figure 9B:
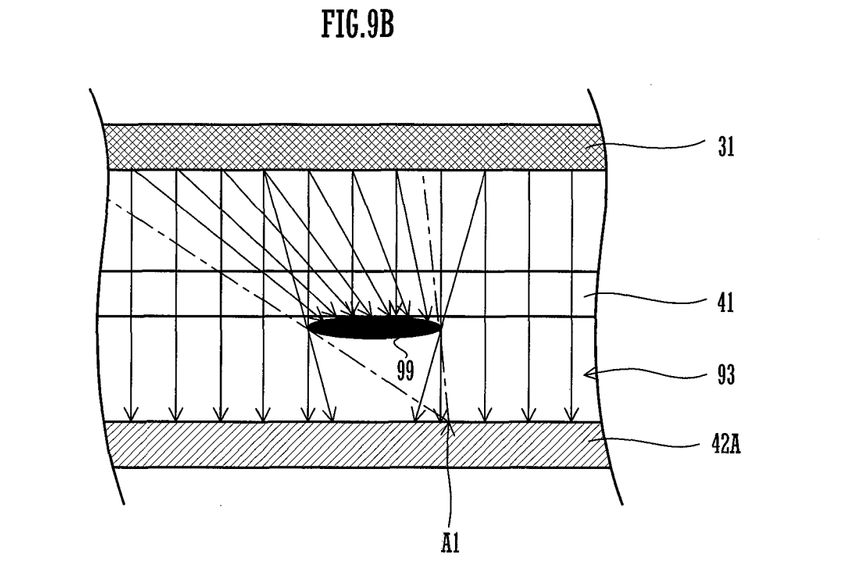

With reference to FIG. 9A and FIG. 9B, the second guide member 42 including the opposed glass 421 and the white reference plate 422 may be replaced with a second guide member 42A having a white reference surface providing the inner side of the document feed path 93.

Figure 10:
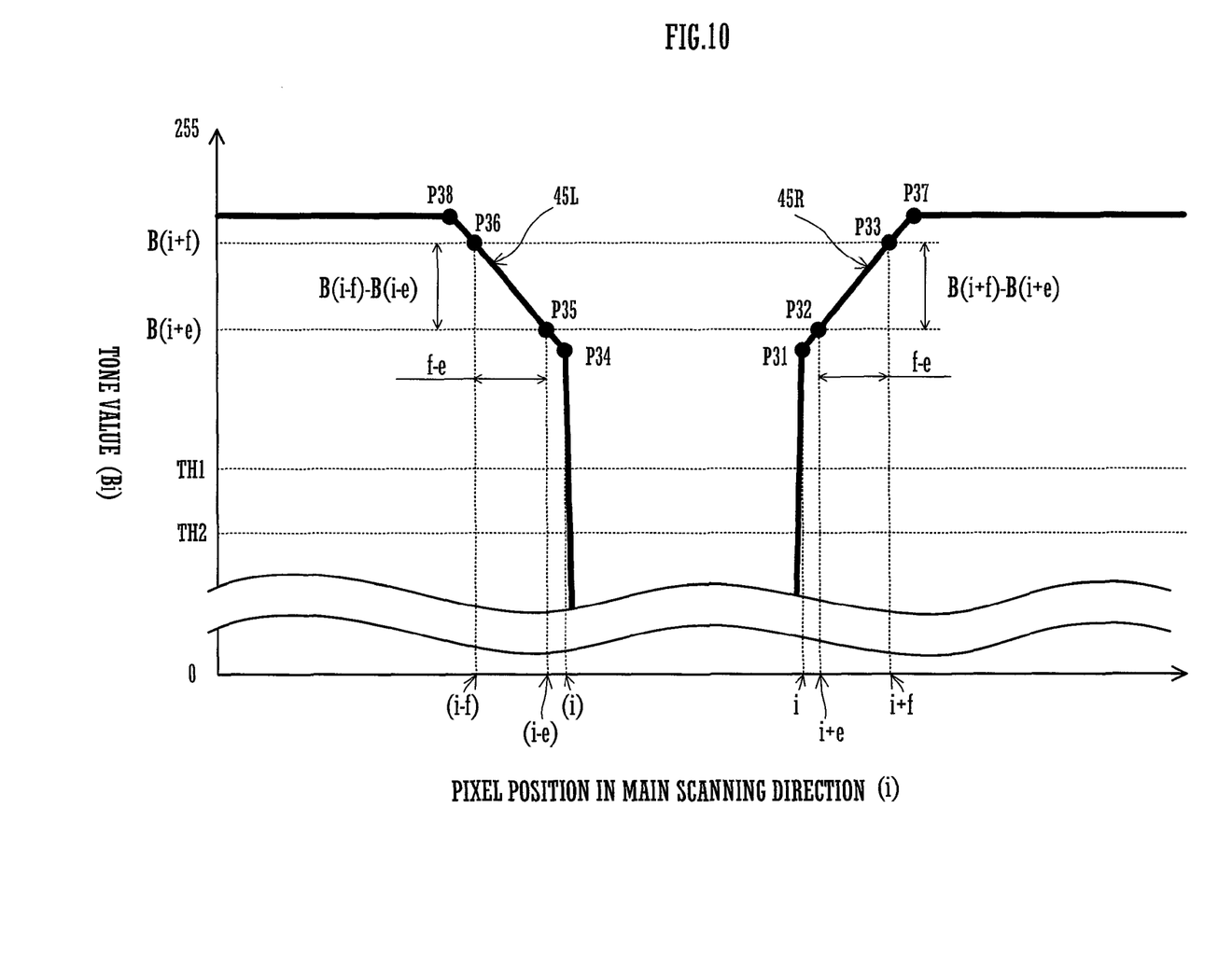
FIG. 10 shows the relationship between a pixel position and a tone value in the main scanning direction in the shading correction image data for a stained second guide member.
Figure 11:
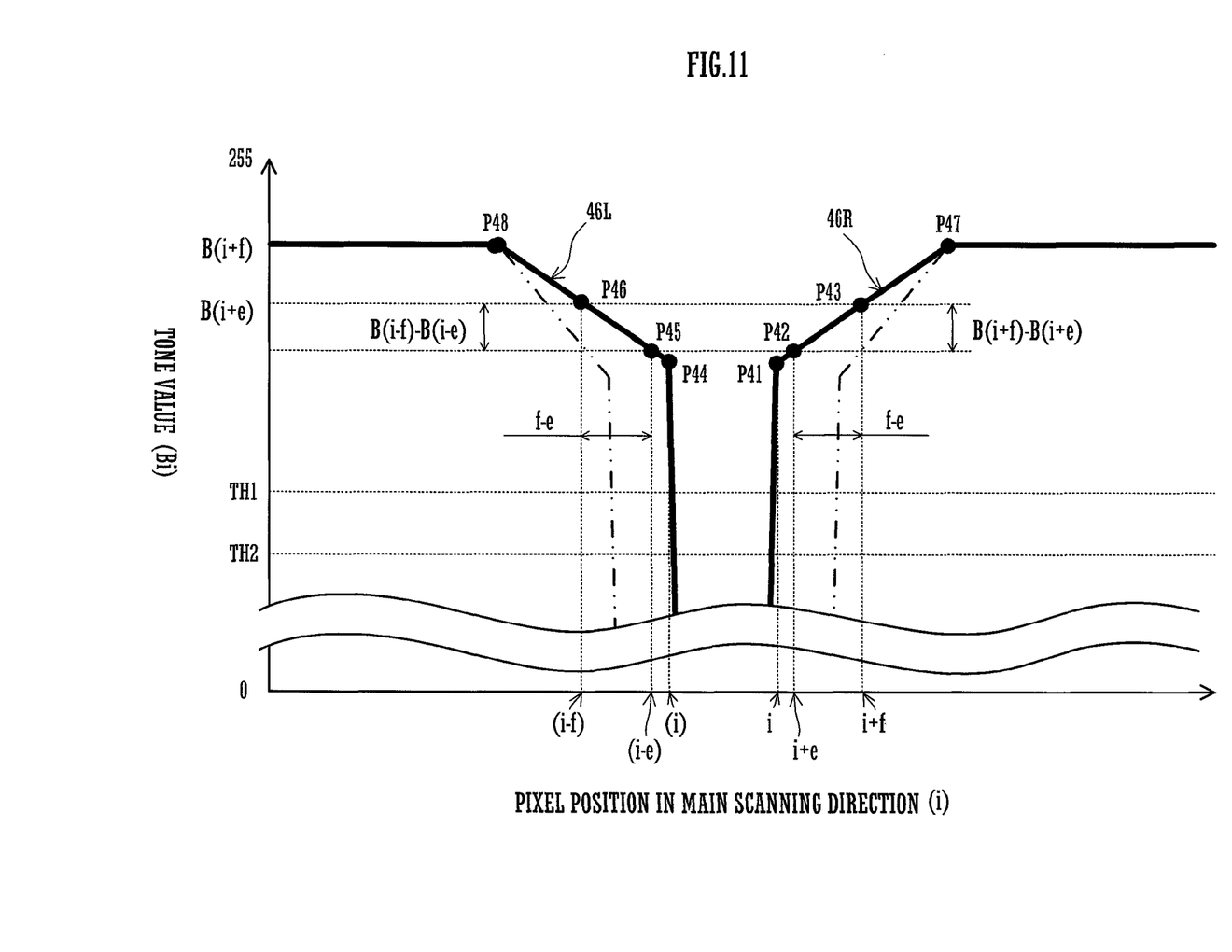
FIG. 11 shows the relationship between a pixel position and a tone value in the main scanning direction in the shading correction image data for a stained reading glass.

Although FIG. 10 and FIG. 11 show, by way of example, the blue B shading correction image data, the same holds true for the red R and the green G shading correction image data. The chain double-dashed lines in FIG. 11 show, for comparison, the shading correction image data shown in FIG. 10 as the heavy lines. The values e and f are pixel numbers (positive integers) set according to the pre-experimental results. The value f is larger than the value e.

When the second guide member 42A is used and the stain 99 is attached to the second guide member 42A, an extremely small space exists between the stain 99 and the white reference surface. The small space will cause the portion of the white reference surface opposed to the edge of the stain 99 to receive less light from the light source 31. Therefore, with reference to FIG. 10, large gradients exist in the portions 45R and 45L in the shading correction image data that correspond to the edge of the stain 99 attached to the second guide member 42A. In other words, FIG. 10 shows the absolute values of the tone value variations (B(i+f)−B(i+e)) in the portions 45R and 45L in the shading correction image data that correspond to the edge of the stain 99 attached to the second guide member 42A, the variations being along a predetermined distance in the main scanning direction. On the other hands, FIG. 11 shows the absolute values of the tone value variations (B(i+f)−B(i+e)) in the portions 46R and 46L that correspond to the edge of the stain 99 attached to the reading glass 41, the variations being along a predetermined distance in the main scanning direction. With reference to FIG. 10 and FIG. 11, the absolute values of the tone value variations in the portions 45R and 45L are larger than the absolute values of the tone value variations in the portions 46R and 46L.

Thus, even when the second guide member 42 is replaced with the second guide member 42A having a white reference surface providing the inner side of the document feed path 93, the tone value variations in the portions 45R, 45L, 46R, and 46L of the shading correction image data that correspond to the edge of the stain 99, the variations being along a predetermined distance in the main scanning direction, may be used to perform the stain location determination of whether the stain 99 is attached to the reading glass 41 or the second guide member 42A, and the stain location determination may be used to perform the handling process for handling the stain 99 of the reading glass 41 or the second guide member 42A.

The handling process includes, as described above, a process of providing, according to the stain location determination, the display section 103 with display data displaying information on whether the stain 99 is attached to the reading glass 41 or the second guide member 42A, and a process of providing, if it is determined that the stain 99 is attached to the reading glass 41, the display section 103 with display data prompting cleaning of the reading glass 41. The handling process also includes a process of adjusting, if it is determined that the stain 99 is attached to the second guide member 42A, the shading correction image data to reduce the affect of the stain 99, and a process of replacing, if it is determined that the stain is attached to the second guide member 42A, the shading correction image data generated by the second image read section 30 at a predetermined acquisition time point with the shading correction image data stored in advance.

The described embodiments are to be considered in all respects as illustrative and not restrictive. It should be appreciated that the scope of the invention is not limited to the described embodiments and is defined by the appended claims. All changes that come within the meaning and range of the appended claims and any equivalents thereof are intended to be embraced within the scope of the invention.

What is claimed is:

1. An image reading apparatus comprising:
 a first guide member and a second guide member fixed and opposed to each other to form a document feed path, the first guide member being made of a transparent material, the second guide member comprising a shading correction white reference member;
 an image read section for illuminating light through the first guide member to the second guide member and generating image data from reflected light; and
 a control section for performing a stain presence determination of whether shading correction image data generated by the image read section reading the image of the white reference member is affected by a stain attached to the first guide member or the second guide member, a stain location determination that determines, when it is determined that the image data is affected by the stain, to which of the first guide member and the second guide member the stain is attached according to a tone value variation in a portion of the shading correction image data that corresponds to the stain edge, the variation being along a predetermined distance in the main scanning direction, and a handling process for handling the stain on the first guide member or the second guide member according to the stain location determination, wherein
 the control section determines in the stain location determination that a stain is attached to the first guide member if an absolute value of the variation is not more than a threshold for the stain location determination and that a stain is attached to the second guide member if the absolute value of the variation is more than the threshold for the stain location determination.

2. The image reading apparatus according to claim 1, further comprising a display section for display based on display data, wherein
 the handling process is a process of, based on the stain location determination, providing the display section with display data displaying information on to which of the first guide member and the second guide member the stain is attached.

3. The image reading apparatus according to claim 1, further comprising a display section for display based on display data, wherein
 when the stain location determination shows that the stain is attached to the first guide member, the handling process is a process of providing the display section with display data prompting cleaning of the first guide member.

4. The image reading apparatus according to claim 3, wherein
 when the stain location determination shows that the stain is attached to the second guide member, the control section does not provide the display section with display data prompting cleaning of the second guide member.

5. The image reading apparatus according to claim 1, wherein
 when the stain location determination shows that the stain is attached to the second guide member, the handling process is a process of adjusting the shading correction image data to reduce the effect of the stain.

6. The image reading apparatus according to claim 1, wherein
 when the stain location determination shows that the stain is attached to the second guide member, the handling process is a process of replacing shading correction image data generated by the image read section in a shading correction process with shading correction image data stored in advance.

7. The image reading apparatus according to claim 1, wherein
 when the shading correction image data comprises a pixel whose tone value is less than a first threshold, the stain presence determination shows that the shading correction image data is affected by the stain.

8. An image forming apparatus comprising:
 the image reading apparatus according to claim 1; and
 an image forming section for performing an image forming process on a recording medium based on image data generated by the image reading apparatus.

* * * * *